US006240206B1

(12) United States Patent
Tokuyama et al.

(10) Patent No.: US 6,240,206 B1
(45) **Date of Patent: *May 29, 2001**

(54) IMAGE PROCESSING APPARATUS

(75) Inventors: Mitsuru Tokuyama, Soraku-gun; Yasushi Adachi; Mihoko Tanimura, both of Nara, all of (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/925,215

(22) Filed: Sep. 8, 1997

(30) Foreign Application Priority Data

Sep. 9, 1996 (JP) ..................................................... 8-238210

(51) Int. Cl.[7] ........................................................ G06K 9/34

(52) U.S. Cl. .......................... 382/176; 382/156; 358/452; 358/462

(58) Field of Search ..................................... 382/156, 173, 382/176, 159, 462; 358/462, 406, 504, 453, 464, 452; 348/93

(56) References Cited

U.S. PATENT DOCUMENTS

| | | | | |
|---|---|---|---|---|
| 4,797,738 | * | 1/1989 | Kashi et al. | 348/93 |
| 5,001,576 | * | 3/1991 | Tanaka et al. | 358/462 |
| 5,086,346 | * | 2/1992 | Fujisawa | 358/453 |
| 5,194,966 | | 3/1993 | Quardt et al. | 358/406 |
| 5,481,380 | | 1/1996 | Bestmann | 358/504 |
| 5,608,819 | * | 3/1997 | Ikeuchi | 382/156 |
| 5,787,195 | * | 7/1998 | Tsujimoto et al. | 382/176 |
| 5,867,593 | * | 2/1999 | Fukuda et al. | 382/176 |

FOREIGN PATENT DOCUMENTS

| | | | |
|---|---|---|---|
| 4305693 | 1/1993 | (DE) | G03F/3/08 |
| 710004A2 | 5/1996 | (EP) . | |
| 61-247164 | 11/1986 | (JP) | H04N/1/40 |
| 6-133159 | 5/1994 | (JP) | H04N/1/40 |

* cited by examiner

*Primary Examiner*—Jose L. Couso
*Assistant Examiner*—Ishrat Sherali
(74) *Attorney, Agent, or Firm*—David G. Conlin; George W. Hartnell, III; Dike, Bronstein, Roberts & Cushman, LLP

(57) ABSTRACT

An image processing apparatus of the present invention is provided with a region separating section and an automatic adjusting section. The region separating section, upon receiving a reference document having a specified ratio of a character region, a photographic region, and a spot region, recognizes and separates the each region of the received document from one another. The automatic adjusting section (1) counts the number of pixels in each of the separated regions and (2) uses the number of pixels thus counted to change a density conversion table, a filter, or a region separation table so as to adjust the separated state of each region such that the number of pixels thus counted is substantially equal to the number of pixels of the region separation state, thereby improving the accuracy of region separation of the image processing apparatus and the image quality of a final image after it is processed with image processing.

20 Claims, 13 Drawing Sheets

F I G. 1
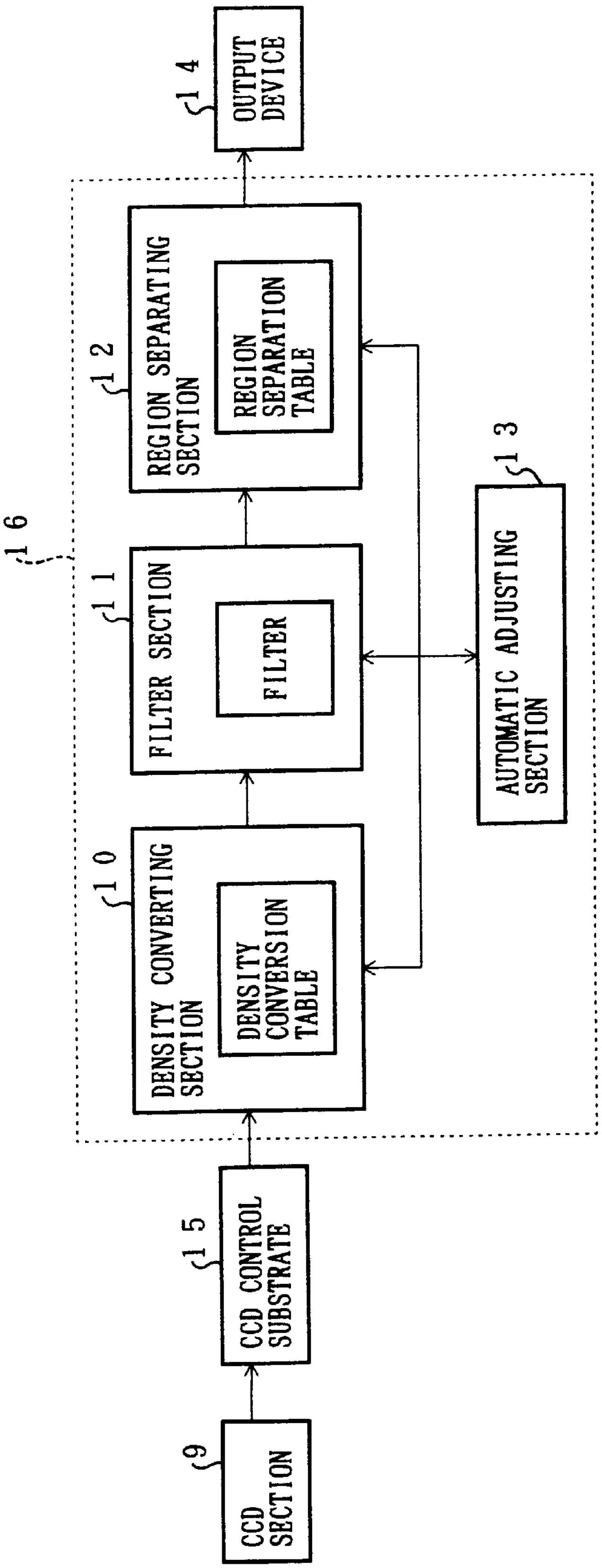

| | | |
|---|---|---|
| | −1 | |
| −1 | 5 | −1 |
| | −1 | |

| | | |
|---|---|---|
| 1/16 | 1/16 | 1/16 |
| 1/16 | 8/16 | 1/16 |
| 1/16 | 1/16 | 1/16 |

| | | |
|---|---|---|
| | -1 | |
| -1 | 15 | -1 |
| | -1 | |

| | | |
|---|---|---|
| | -1 | |
| -1 | 17 | -1 |
| | -1 | |

| | | |
|---|---|---|
| | -1 | |
| -1 | 20 | -1 |
| | -1 | |

| | | |
|---|---|---|
| | -1 | |
| -1 | 25 | -1 |
| | -1 | |

| | | |
|---|---|---|
| | -1 | |
| -1 | 30 | -1 |
| | -1 | |

| | | |
|---|---|---|
| | -1 | |
| -1 | 40 | -1 |
| | -1 | |

| | | |
|---|---|---|
| | -1 | |
| -1 | 47 | -1 |
| | -1 | |

| | | |
|---|---|---|
| | -1 | |
| -1 | 54 | -1 |
| | -1 | |

| | | |
|---|---|---|
| | -1 | |
| -1 | 60 | -1 |
| | -1 | |

IMAGE PROCESSING APPARATUS

FIELD OF THE INVENTION

The present invention relates to an image processing apparatus, for use in a scanner, a digital copying machine, a facsimile, or other devices, which recognizes a character region, a photographic region, and a spot region of an image obtained by scanning a document so as to carry out an optimum process for each region according to its feature.

BACKGROUND OF THE INVENTION

It has been a problem of a conventional image processing apparatus that the sharpness or an input level of an image input section composed of an input device such as CCD (Charge Coupled Device) varies depending on individual apparatuses. For this reason, when shipping image processing apparatuses, if a region judgement (judging whether a region is a character region, a spot region, and a photographic region) using a reference document is carried out with respect to individual apparatuses, the result of the judgement is not coincident with respective ratio specified in the reference document. Here, the reference document includes a character region, a spot region, and a photographic region at such a specified ratio.

As a countermeasure, in order to compensate the variations in the input devices of the image processing apparatuses, an improvement in the mechanical and dimensional accuracy of the input device and correction such as an adjustment of an input level (shading correction) are made. However, the improvement in the mechanical and dimensional accuracy involves a substantial increase in cost. Also, the shading correction has not reached a level where the variations in the input devices are completely corrected. This results from the fact that the accuracy of a reference white plate density and the accuracy of mounting the white plate are not high enough.

In order to improve an image quality of an image processed by the image processing apparatus, while still having the problem of variations in the input devices, it has been a focus of ongoing research to develop technology which allows (1) separation of the character, photographic, and spot regions of a document which is subjected to image processing and (2) an optimum process to be carried out according to the feature of each region.

For example, Japanese Unexamined Patent Publication No. 133159/1994 (Tokukaihei 6-133159) discloses an arrangement of an image processing apparatus for accurate detection of a spot region with a simple arrangement. According to this arrangement, first, a local change in image data of a region is detected with respect to a main-scanning direction and a sub-scanning direction, respectively. Secondly, it is determined whether the region is a spot region based on pixels, in the region, having detected changes above a predetermined value. Finally, a smoothing filter is applied to the spot region so as to prevent moire, and an MTF correction filter (edge enhancement filter) is adopted to a non-spot region so as to sharpen the image.

Despite the fact that the quality of region separation has been improving in the past years, there has been no improvement as to the correction of variations in input devices. This presents a problem that the image quality of an image that has been image-processed deteriorates since the accuracy of region separation greatly changes depending on the degree of variations in the input devices. That is to say, despite the fact that an optimum process is carried out for each of the separated regions, the image quality deteriorates due to low accuracy of the region separation.

Even in the arrangement disclosed in the afore-mentioned publication, the accuracy of region separation greatly changes depending on the degree of the variations in the input devices. Because this arrangement does not have means for adjusting the result of the region separation so as to compensate for change in an input device and the variation in the input devices, it presents a problem that a high image quality is achieved in one apparatus, while posing a problem of a coexisting region in another apparatus in which a spot region and a non-spot region coexist. Such a coexisting region causes that the resulting image is likely to have a poor image quality.

SUMMARY OF THE INVENTION

It is an object of the present invention to provide an image processing apparatus wherein the accuracy of region separation can be improved so as to improve the image quality of a final image that has been image-processed even if sharpness or input levels of input devices vary depending on individual image processing apparatuses.

In order to achieve the above-mentioned object, an image processing apparatus of the present invention includes a region separating section, upon receiving a reference document, for recognizing whether each part of the reference document belong to a character region, a photographic region, or a spot region of the reference document so as to carry out region separation for the reference document, the character region, the photographic region, and the spot region being provided at a specified ratio, an automatic adjusting section for adjusting a region separation state of the region separating section based on (1) a result of region separation for the reference document by the region separating section and (2) the specified ratio of the character region, the photographic region, and the spot region in the reference document.

According to the image processing apparatus having the described arrangement, when the region separating section carries out region separation for the reference document, the automatic adjusting section adjusts the state of region separation for the region separating section based on (1) the result of the region separation by the region separating section and (2) the ratio specified in the reference document. Here, if the automatic adjusting section adjusts the state of region separation in such a manner that the ratio of each region which is determined from the result of the region separation for the reference document by the region separating section is substantially equal to the preset ratio of the region of the reference document, it is possible to improve the accuracy of the region separation even if variations exist in input devices through which image data are inputted to the image processing apparatus, thereby permitting optimum image processing to be carried out for each region so as to improve the image quality of the final image. Further, it is also possible to make the final image to have a desired image quality if the preset region separation state is set as the user prefers.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a block diagram showing a structure of an image processing apparatus in accordance with one embodiment of the present invention.

FIG. 6(*a*) is an explanatory drawing of an enhancement processing-use filter employed in a filtering process circuit of the region separating section of FIG. 3, and FIG. 6(*b*) is an explanatory drawing of a smoothing processing-use filter employed in the above filtering process circuit.

FIG. 11(*a*) through FIG. 11(*i*) are explanatory drawings showing the filter.

DESCRIPTION OF THE EMBODIMENTS

The following will explain one embodiment of the present invention. In the present embodiment, explanations will be given to the case where an image processing apparatus is employed in a scanner.

Figure 2:
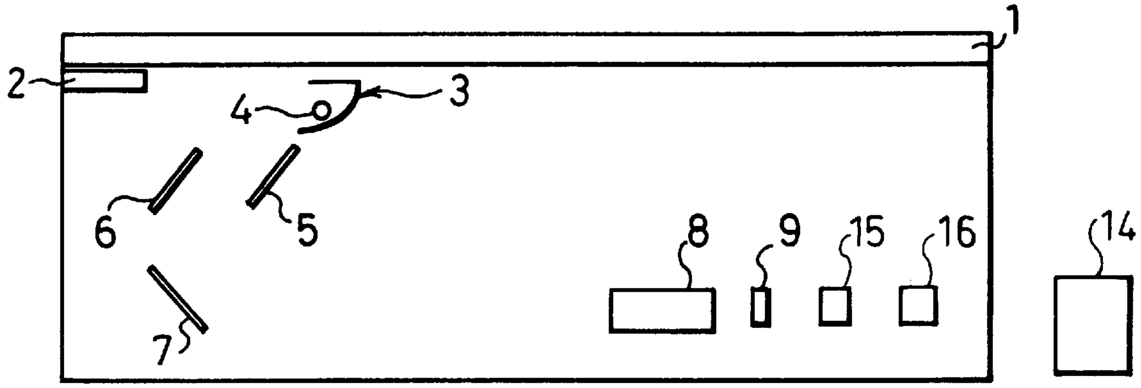
FIG. 2 is an explanatory drawing showing a structure of a scanner adopting the image processing apparatus of FIG. 1.

FIG. 2 is an explanatory drawing showing a structure of a scanner provided with an image processing apparatus of the present embodiment (hereinafter simply referred to as the present image processing apparatus). As shown in FIG. 2, the scanner is provided with a document platen section 1 made of transparent glass, a reference white plate 2 provided below the document platen section 1, an illuminating unit reflector section 3, an illuminating unit exposure lamp section 4, first through third mirrors 5, 6, and 7, a lens 8, a sensor (CCD) section 9, a CCD control substrate 15, and an image processing substrate 16. In the present embodiment, a halogen lamp is adopted as the exposure lamp.

In the above-mentioned scanner, an illuminating unit composed of the illuminating unit reflector section 3 and the illuminating unit exposure lamp 4 illuminates a document which has been set on the document platen section 1 such that the reflected light off the document converges on the CCD section 9 through the mirrors 5, 6, and 7 and the lens 8 so as to become image data. Thereafter, the image data are sent to the CCD control substrate 15. Upon receiving the image data, in the CCD control substrate, an adjustment of a reading timing and an output adjustment are carried out so as to output the image data to the image processing substrate 16 provided with the present image processing apparatus. After image-processed by the image processing substrate 16 (described later), the final image data is outputted to an output device 14 such as a personal computer, a facsimile, or a printer. Note that, the present image processing apparatus may be employed not only in the scanner but also in a digital copying machine, a facsimile, and other devices.

FIG. 1 is a block diagram showing a schematic structure of the present image processing apparatus and its peripheral devices. As shown in FIG. 1, the present image processing apparatus is provided with a density converting section 10, a filter section 11, a region separating section 12, and an automatic adjusting section 13 which are all provided on the image processing substrate 16.

The density converting section 10 carries out a density conversion based on a density conversion table (see FIG. 9) with respect to the image data inputted from the CCD section 9. In the density conversion table, a ratio of an outputted document density to an inputted document density is set beforehand. When converting density, the density converting section 10 selects a density conversion table having such a slope that an outputted document density of the image data is linearly corrected with respect to an inputted document density.

The filter section 11 carries out a filtering process on the image data, which has been linearly corrected with respect to the inputted document density by the density converting section 10. The filtering process is carried out based on a filter having a preset degree of enhancement (see FIG. 11(*a*) through FIG. 11(*i*)). In the filtering process, the filter section 11 processes the image data with a filter having a uniform filtering characteristic so as to correct the image data which has become unclear in the CCD section 9.

The region separating section 12 recognizes a photographic region, a character region, and a spot region of the inputted document which has been corrected by the filter section 11, and separates each region from one another. The region separating section 12 recognizes and separates regions based on a region separation table shown in FIG. 13(*a*) through FIG. 13(*i*). In the region separation table, the complexity of each region versus maximum value-minimum value is set beforehand. The region separating section 12 separates regions with respect to each pixel of the image data, and outputs data indicative of respective regions with respect to each pixel. For example, a photographic region, a character region, and a spot region are indicated respectively by the data “0”, “1”, and “2”. Details of how the region separating section 12 carries out region separation will be described later.

The automatic adjusting section 13 counts the number of pixels (count) so as to recognize the size of each region which has been separated by the region separating section 12, and automatically adjusts image processing carried out by the density converting section 10, the filter section 11, or the region separating section 12 such that each region corresponds to a specific region separation state of a reference document or a desired region separation state. There are Method 1 through Method 3 for automatically adjusting image processing:

(Method 1) replacing a density conversion table of the density converting section 10 with another table. (Method 2) replacing a filter of the filter section 11 with another filter. (Method 3) replacing a region separation table of the region separating section 12 with another table. All of the above methods are carried out according to the number of pixels counted.

Note that, the output which has been adjusted by the automatic adjusting section 13 is outputted to the output device 14 after being subjected to required processing, i.e., a density conversion in accordance with the output device 14 or user's preference.

Figure 3:
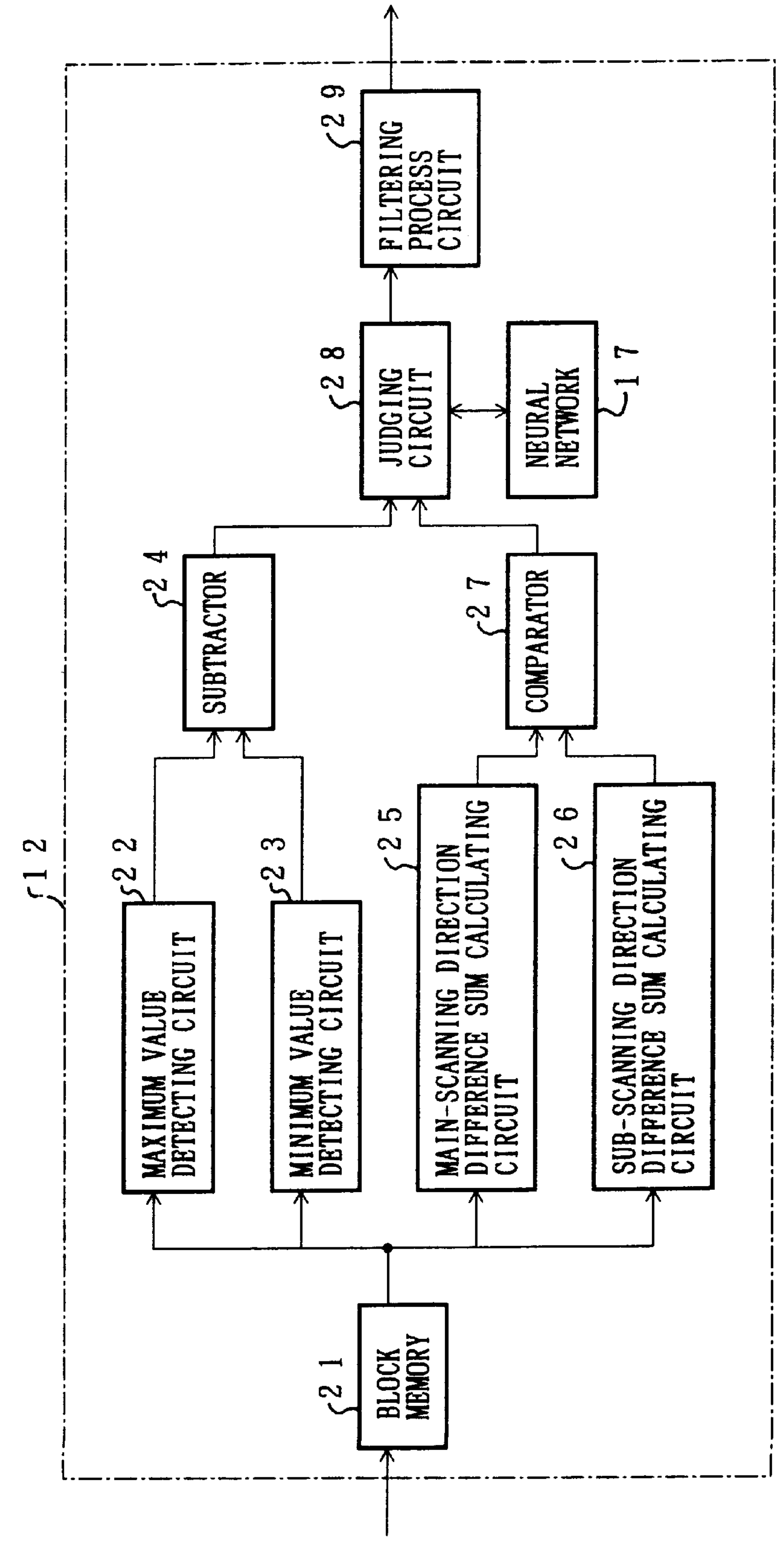
FIG. 3 is a block diagram showing a structure of a region separating section of the image processing apparatus of FIG. 1.

Next, details of the region separating section 12 will be explained referring to FIG. 3. FIG. 3 is a block diagram showing a structure of the region separating section 12. As shown in FIG. 3, the region separating section 12 is provided with a block memory 21, a maximum value detecting circuit 22, a minimum value detecting circuit 23, a subtractor 24, a main-scanning direction difference sum calculating circuit 25, a sub-scanning direction difference sum calculating circuit 26, a comparater 27, a judging circuit 28 provided with a neural network 17, and a filtering process circuit 29.

The block memory 21 stores inputted image data of plural lines in 256 tones for each pixel. When a target pixel and its adjacent pixels of the image data constitute one block, and when the image data is outputted from the block memory 21, the maximum value detecting circuit 22 determines the maximum signal level in the block, and the minimum value detecting circuit 23 determines the minimum signal level in the block. The subtractor 24 outputs the difference between the maximum signal level and the minimum signal level as a feature parameter $P_a$ (first feature parameter corresponding to "((maximum value)–(minimum value)" in FIG. 13(*a*) through FIG. 13(*i*)).

The main-scanning direction difference sum calculating circuit 25 accumulates one after another the difference between every two adjoining pixels in a main-scanning direction in the block so as to determine a sum of the differences. The sub-scanning direction difference sum calculating circuit 26 accumulates one after another the difference between every two adjoining pixels in a sub-scanning direction (direction orthogonal to the main-scanning direction) in the block so as to determine a sum of the differences. The comparator 27 compares the sum of the differences in the main-scanning direction with the sum of the differences in the sub-scanning direction, and outputs the one which gives a smaller value as a feature parameter $P_b$ (second feature parameter corresponding to "complexity" in FIG. 13(*a*) through FIG. 13(*i*)).

The judging circuit 28, upon receiving the feature parameter $P_a$ and the feature parameter $P_b$, applies a preset border line of the region separation tables of FIG. 13(*a*) through FIG. 13(*i*) with respect to the two feature parameters $P_a$ and $P_b$ on a two-dimensional plane having $P_a$ and $P_b$ axes or adopts the neural network 17 (described later) so as to output values indicative of (1) the likelihood that the block pixel is located in the character region, (2) the likelihood that a block pixel is located in the photographic region, and (3) the likelihood that a block pixel is located in the spot region, respectively. Thereafter, according to the output value, the judging circuit 28 judges whether (a) to carry out a smoothing process so as to reduce the change in a signal level by taking a weighted mean between the target pixel and the adjacent pixels, (b) to carry out an enhancement process so as to further enhance a greatly changing signal level by adding the difference between the target pixel and the adjacent pixels to the target pixel, or (c) to output the target pixel without carrying out any processing.

The filtering process circuit 29 changes a weight of a filter as required and selects an optimum filter for each region so as to carry out the smoothing process or the enhancement process based on the result of the judgement obtained in the judgement circuit 28.

Figure 4:
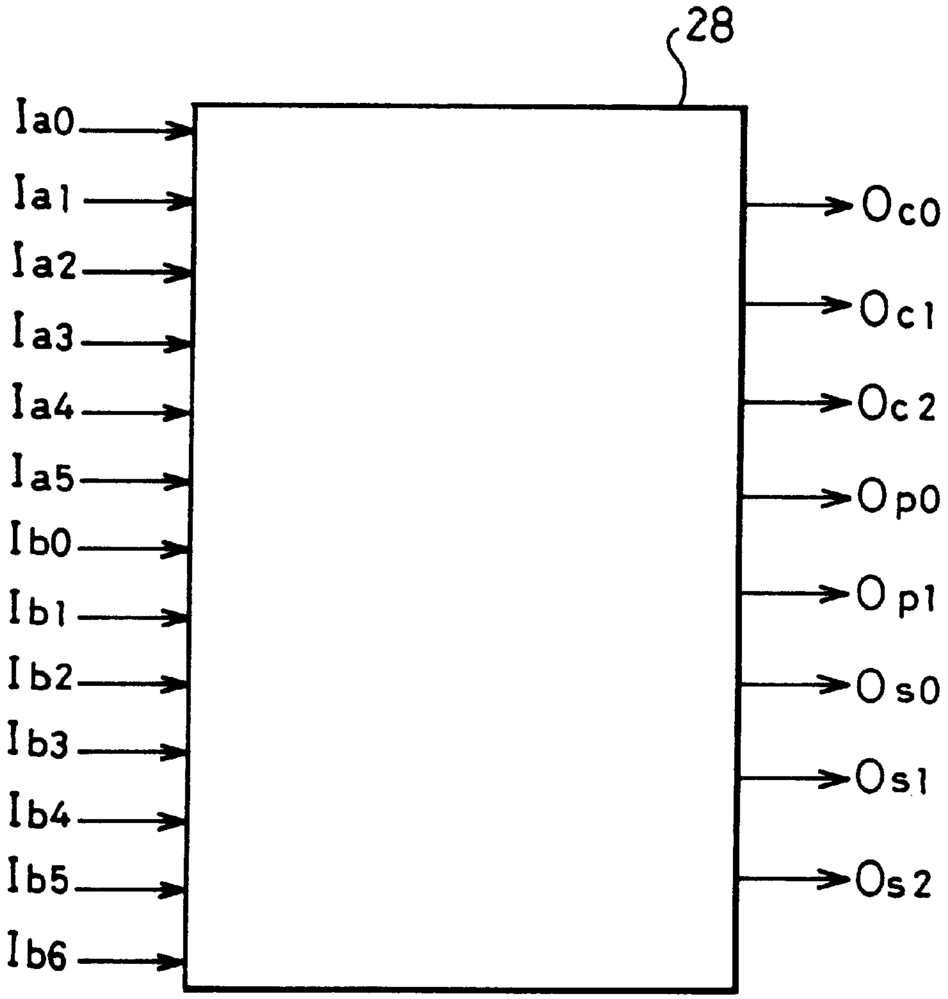
FIG. 4 is an explanatory drawing showing a structure of a judging circuit of the region separating section of FIG. 3.

FIG. 4 is an explanatory drawing showing an example of a structure of the judging circuit 28.

The input value of the feature parameter $P_a$ is 6 bits, more precisely, the significant 6 bits of the 8 bits are used. In FIG. 4, the input $I_{a0}$ through $I_{a5}$ are used as inputs of the feature parameter $P_a$. The input value of the feature parameter $P_b$ is 7 bits, more precisely, the most significant 7 bits of the 10 bits are used. In FIG. 4, the inputs $I_{b0}$ through $I_{b6}$ are used as inputs of the feature parameter $P_b$. The total output value of the judging circuit 28 is respectively 8 bits, of which (1) 3 bits ($O_{c0}$ through $O_{C2}$ in FIG. 4) are used as an output value indicative of the likelihood of the character region, (2) 2 bits ($O_{p0}$ and $O_{p1}$ in FIG. 4) are used as an output value indicative of the likelihood of the photographic region, and (3) 3 bits ($O_{s0}$ through $O_{s2}$ in FIG. 4) are used as an output value indicative of the likelihood of the spot region.

Figure 5A:
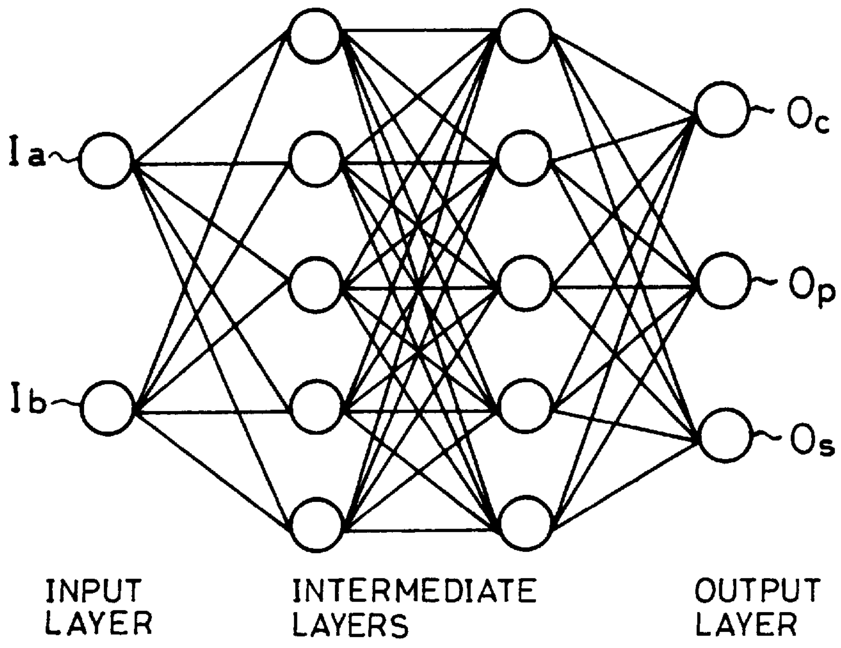
FIG. 5(*a*) is an explanatory drawing of a neural network provided in the judging circuit of FIG. 3, and FIG. 5(*b*) is an explanatory drawing showing how signals are inputted and outputted in a neural element of the neural network.
Figure 5B:
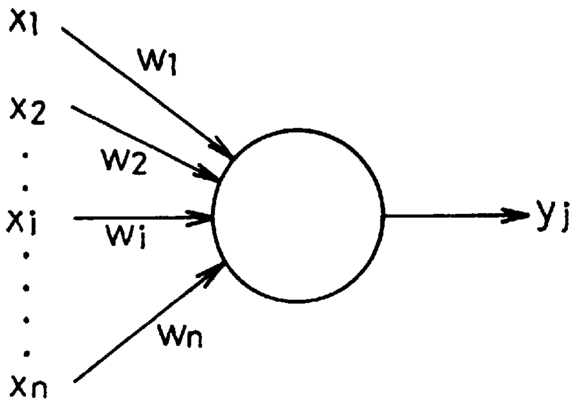

The judging circuit 28 uses either (1) region separation table, having a predetermined border line describing input-output characteristics, determined by a neural network 17 or (2) the neural network 17 itself so as to (a) recognize from the input value the respective likelihood of the character region, the photographic region, and the spot region and (b) outputs them as numeral values, respectively. FIG. 5(*a*) is an explanatory drawing showing a neural network 17 adopted by the judging circuit 28. As shown in FIG. 5(*a*), the neural network 17 is a four-layer perceptron composed of an input layer, two intermediate layers, and an output layer. A neural element $I_a$ and a neural element $I_b$ of the input layer respectively receive a normalized feature parameter $P_a$ and a normalized feature parameter $P_b$. The neural elements $O_c$, $O_p$, and $O_s$ of the output layer respectively output values indicative of the respective likelihood of the character region, the photographic region, and the spot region.

The neural elements $I_a$ and $I_b$ of the input layer are respectively connected to the respective inputs of the neural element inputs of the intermediate layer. The outputs of intermediate layer are respectively connected to the inputs of the neural elements $O_c$, $O_p$, and $O_s$ of the output layer. FIG. 5(*b*) is an explanatory drawing showing how the neural elements $O_c$, $O_p$, and $O_s$ of the output layer receive signals. As shown in FIG. 5(*b*), each of the neural elements $O_c$, $O_p$, and $O_s$ has multiple inputs and a single output. In the case where the input value for the jth neural element of the neural elements $O_c$, $O_p$, and $O_s$ of the neural network 17 is $x_i$, the weight coefficient of the input value $x_i$ is $w_i$, and the output value is $y_j$, each neural element calculates the sum of products in accordance with equation (1). $X_i$ (the result of equation (1)) is substituted in the equation (2) so as to output $y_j$.

$$X_j = \sum_{i=1}^{n} w_{ij} \times x_i \tag{1}$$

$$y_j = f(X_j) = \frac{1}{1 + \exp(-X_j)} \tag{2}$$

In the case of adopting a well-learned neural network 17, upon receiving the first feature parameter $P_a$ and the second feature parameter $P_b$ obtained in the character region, the neural elements $O_c$, $O_p$, and $O_s$ of the output layer of the neural network 17 respectively output values close to "1", "0", and "0". Similarly, upon receiving the first feature parameter $P_a$ and the second feature parameter $P_b$ obtained in the photographic region, the neural elements $O_c$, $O_p$, and $O_s$ of the output layer respectively output values close to "0", "1", and "0". Likewise, upon receiving the first feature parameter $P_a$ and the second feature parameter $P_b$ obtained in the spot region, the neural elements $O_c$, $O_p$, and $O_s$ of the output layer respectively output values close to "0", "0", and "1".

In the neural network 17, when determining the input-output characteristics of the region separation table, namely, when defining the border lines of the region separation table, each neural element of the input layer and the output layer corresponds to 8 bits. In the case of adopting the neural network in the judging circuit 28, each neural element of the input layer and the output layer respectively corresponds to the number of bits of the input and output of the judging circuit 28.

The border line of the region separation table is set by the neural network 17 in the following manner. The neural network 17 is provided with a reference document (reference image) beforehand (here, reference document includes three types of regions: character, photographic, and spot regions). For example, the neural network 17 calculates two-dimensional feature parameters $P_a$ and $P_b$ with respect to a character region of the reference document so as to define that the points plotted by the feature parameters $P_a$ and $P_b$ are in the character region. The same process is carried out for a photographic region and a spot region of the reference document. The neural network then defines the border lines in the region separation table based on the plot of the reference document so as to separate the region separation table into a character region, a photographic region, and a spot region, respectively.

FIG. 6(*a*) and FIG. 6(*b*) are explanatory drawings showing an example of a weight of a filter in the filtering process circuit 29. When it is judged by the judging circuit 28 that the image data is in a character region, namely, when it is judged based on the two feature parameters $P_a$ and $P_b$ that the image data belong to the character region on the region separation tables of FIG. 13(*a*) through FIG. 13(*i*), or when it is determined by the neural network 17 that the output value indicative of the likelihood of the character region is greater than that of the likelihood of the photographic region and the likelihood of the spot region, the image data are processed with an enhancement filter of FIG. 6(*a*) so as to make characters and line drawings, etc. clear. In the example of FIG. 6(*a*), the target pixel (central pixel) is enhanced by the weight coefficients of pixels surrounding the target pixel.

Similarly, when it is judged by the judging circuit 28 that the image data is in a spot region, namely, when it is judged based on the two feature parameters $P_a$ and $P_b$ that the image data belong to the spot region on the region separation table of FIG. 13(*a*) through FIG. 13(*i*), or when it is determined by the neural network 17 that the output value indicative of the likelihood of the spot region is greater than that of the likelihood of the photographic region and the likelihood of the character region, the image data are processed with a smoothing filter having weight coefficients such as the one shown in FIG. 6(*b*) so as to suppress a spot frequency component as a countermeasure against the generation of moire.

Likewise, when it is judged by the judging circuit 28 that the image data is in the photographic region, namely, when it is judged based on the two feature parameters $P_a$ and $P_b$ that the image data belong to the photographic region on the region separation table of FIG. 13(*a*) through FIG. 13(*i*), or when it is determined by the neural network 17 that the output value indicative of the likelihood of the photographic region is greater than that of the likelihood of the spot region and the likelihood of the character region, the inputted signal is outputted without being processed.

The output value of the judging circuit 28 allows the weight coefficients of each filter to be continuously changed according to the respective output values of the judging circuit 28. Also, it is possible to prevent an image from being adversely affected by a judgement error in which a signal is outputted without being filtering-processed. The judgement error occurs when there is not much difference in the output values indicative of respective regions.

As described, the region separating section 12 has an arrangement wherein (1) the feature parameters $P_a$ and $P_b$ are categorized according to the preset border lines on a two-dimensional plane having $P_a$ and $P_b$ axes so as to judge whether the target pixel of the inputted image data are located in the character region, the photographic region, or the spot region, and (2) an optimum process is carried out for each region based on the result of the judgement, thereby making it easier to improve the image quality of the image to be outputted.

Further, since the feature parameters $P_a$ and $P_b$ are located on the two-dimensional plane (two-dimensional look up table), it is preferable that the categorizing process of the feature parameters $P_a$ and $P_b$ are carried out based on the border line categorizing the feature parameters $P_a$ and $P_b$ on the two-dimensional plane, rather than by comparing each of the feature parameters $P_a$ and $P_b$ with constant preset values. In the region separating section 12, since the optimum border line is defined by the neural network 17, the recognizing accuracy can be improved.

Also, in the region separating section 12, despite the fact that the filtering process is carried out for each region after recognizing the region so as to realize a high quality image, the weight of a filter is selected based on the output value of the neural network 17, thereby permitting the optimum process to be carried out. Also, because the filtering process is carried out locally, the edge portion of the photographic region can be enhanced in the same manner as the edge of the characters are enhanced, thereby realizing a high quality image.

Figures 6A, 6B, 7:
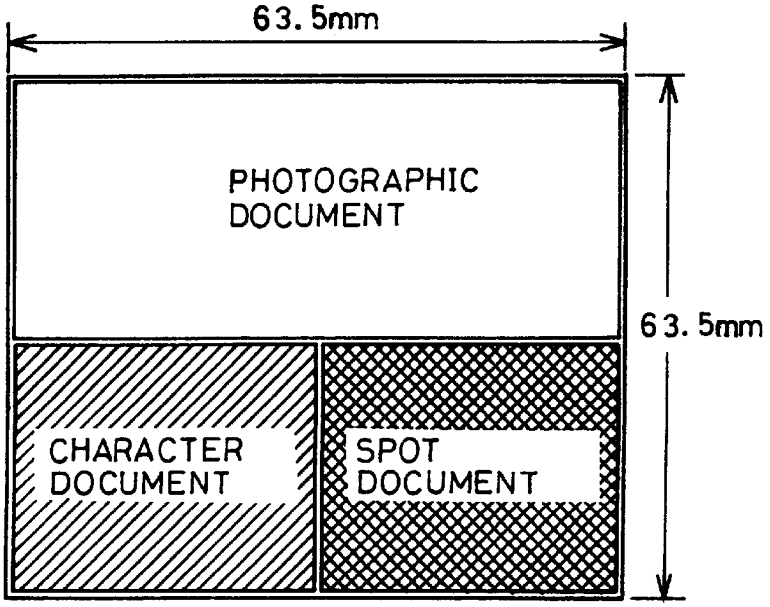
FIG. 7 is an explanatory drawing showing a reference document.

Hereinafter, the three methods of automatic adjustment, which are carried out by the automatic adjusting section 13 of FIG. 1, will be described in detail. Here, as a reference document, a document shown in FIG. 7 is adopted in which a photographic region, a character region, and a spot region coexist. If the resolution of the CCD section 9 (input device) is 400 dpi, one pixel has a dimension of 63.5 μm×63.5 μm. Note that, in the case of adopting an input device having 400 dpi, a 133-line-document (having 133 pairs of white and black lines per inch) tends to cause an deterioration of an image. Therefore, it is preferable to select a 133-line-document including a document having different number of spot lines. The number of spot lines may be selected in accordance with an input resolution or the method of region separation. Note that, in the following explanations, the total number of pixels in the reference document is 1000000 pixels (1000 pixels×1000 pixels).

Figure 9:
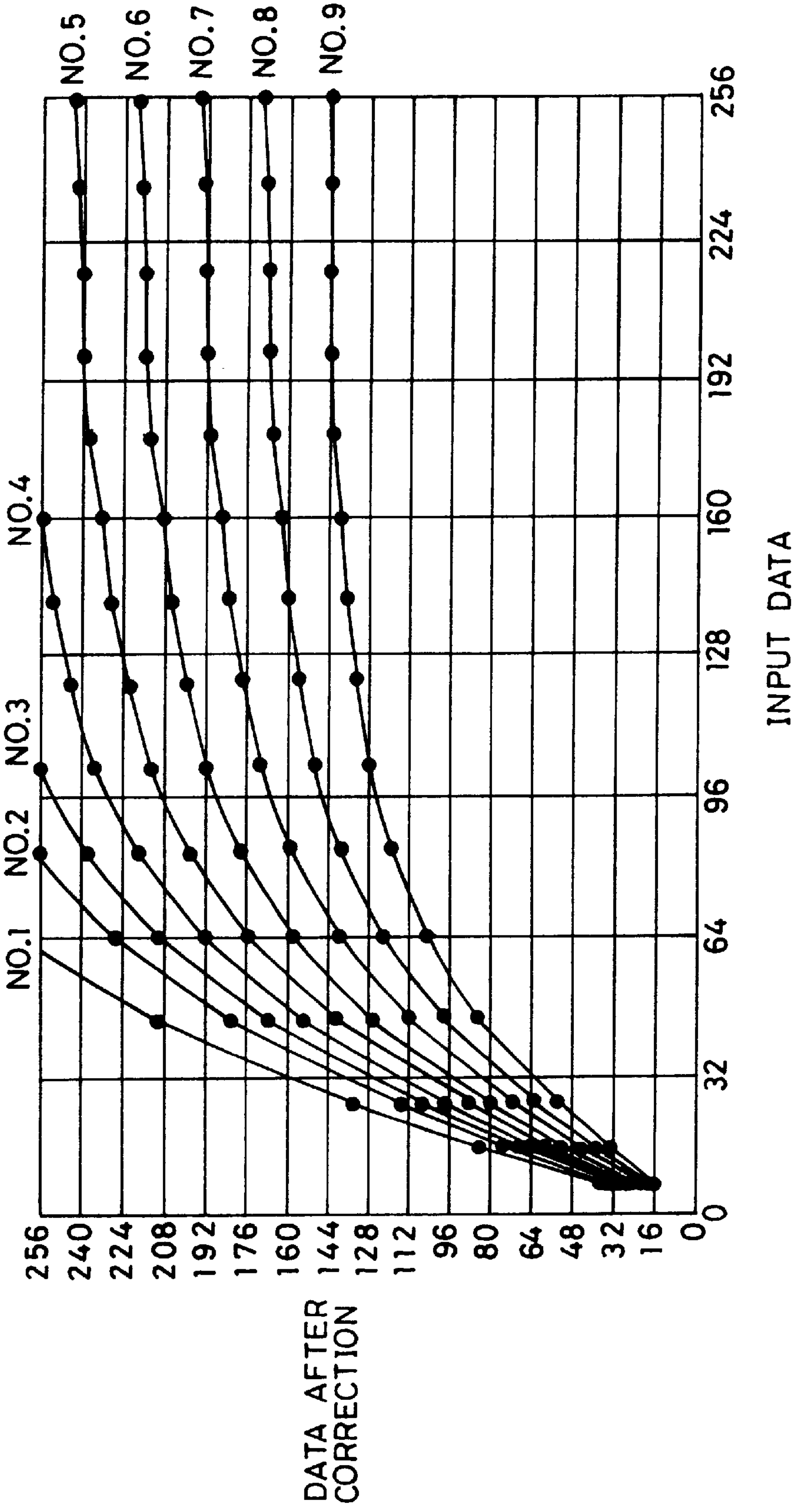
FIG. 9 is a graph showing the density conversion table.

(Method 1) The correction of an output level of the input device is adjusted by using a density conversion table. FIG. 9 is an explanatory drawing showing one example of the density conversion table. In FIG. 9, No. 1 through No. 9 are table numbers of the density conversion tables. In this example, the smaller the table number is, the greater the change in density is, and the larger the table number is, the smaller the change in density is. A density conversion table No. 5 is selected as an initial density conversion table.

Figure 8:
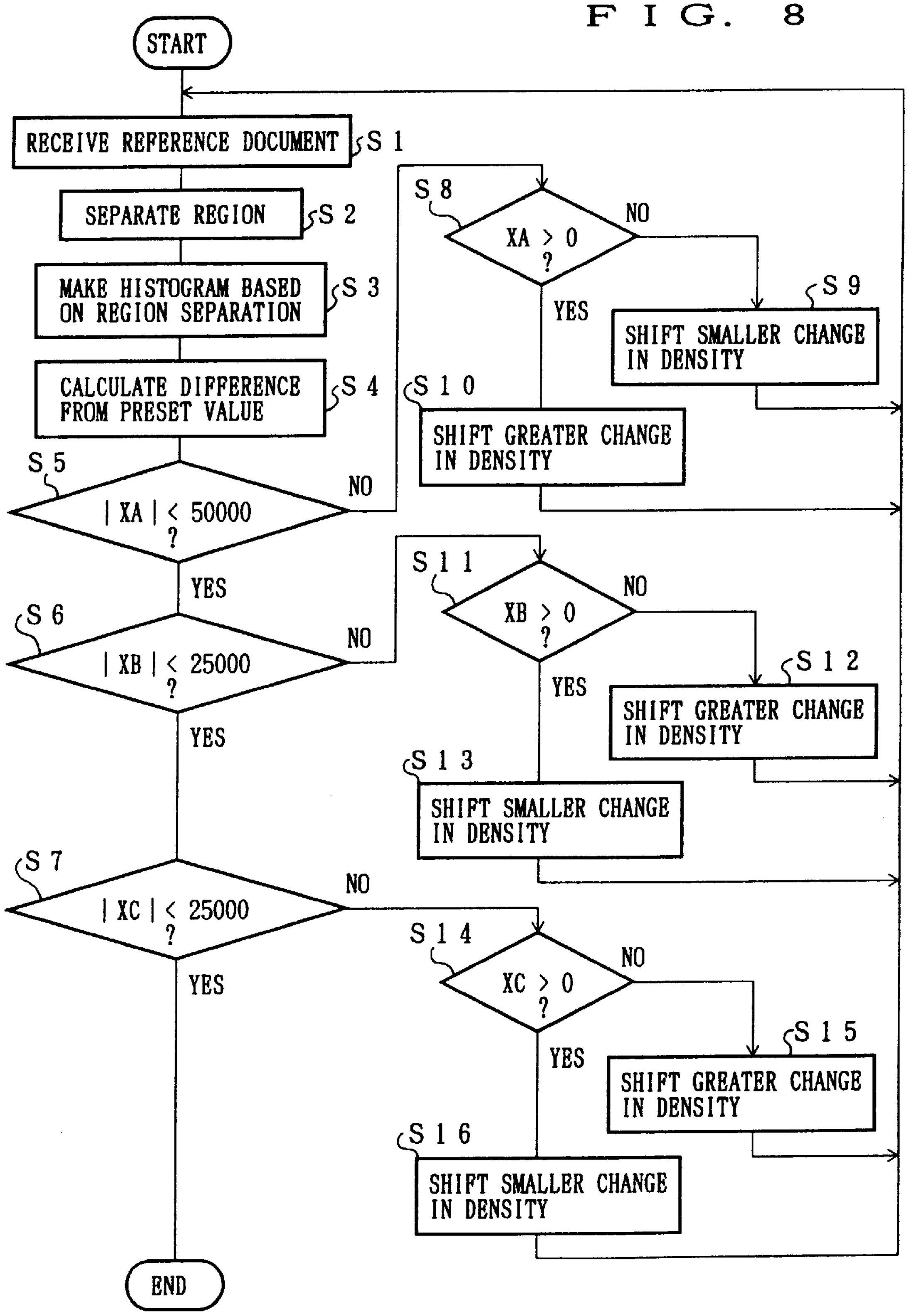
FIG. 8 is a flowchart showing the operation of an automatic adjusting process when a density conversion table is used in the image processing apparatus of FIG. 1.

FIG. 8 is a flowchart showing the operation of automatic adjusting process in the case of adopting the density conversion table of the present image processing apparatus. As shown in FIG. 8, in step 1 (hereinafter, abbreviated to S1), the reference document is received. In S2, the region separation is carried out by the density converting section 10, the filter section 11, and the region separating section 12. In S3, the automatic adjusting section 13 prepares a histogram from the result of the region separation, and stores frequencies (the number of pixels) of the character region, the photographic region, and the spot region as A, B, and C, respectively. Here, a region separation state which has been stored beforehand, namely, preset values of the frequencies of the photographic region, the character region, and the spot region are AR=500000, BR=250000, and CR=250000, respectively.

In S4, the automatic adjusting section 13 calculates the difference between (1) the count A, B, and C of the region separation and (2) the above-noted region separation state to give XA, XB, and XC. Namely, XA=A−AR, XB=B−BR, and XC=C−CR. It is preferable that the ratios of the differences thus determined to the preset values (=XA/AR, XB/BR, XC/CR) fall within ±10 per cent. The ratios thus determined in this manner become target values of the region separation, i.e., the specified ratio.

In S5, the automatic adjusting section 13 judges if the absolute value of the difference XA of the photographic region is less than 50000 (=500000×10%). If it is judged in S5 that the absolute value of XA is less than 50000, a region separation state which satisfies the target level is achieved, and the sequence goes to S6. In S6, it is judged if the absolute value of the difference XB of the character region is less than 25000 (=250000×10%). If it is judged in S6 that the absolute value of XB is less than 25000, the sequence goes to S7. In S7, it is judged if the absolute value of the difference XC of the spot region is less than 25000 (=250000×10%). If it is judged in S7 that the absolute value of XC is less than 25000, the automatic region separation adjusting process is finished since the respective regions are desirably separated.

In the case where the absolute value of XA exceeds 50000 in S5, the automatic adjusting section 13 judges in S8 if XA is greater than 0 so as to determine how the density conversion table should be changed. A negative value of XA in S8 indicates that the photographic region is smaller than that of the preset region separation state, namely, a change in density in the reference document is too large. In this case, in S9, the automatic adjusting section 13 changes the density conversion table so that the change in density becomes smaller (so that the table number becomes greater than No. 5). In contrast, a positive value of XA indicates that the photographic region is larger than that of the preset region separation state, namely, a change in density in the reference document is too small. In this case, in S10, the automatic adjusting section 13 changes the density conversion table so that the change in density becomes larger (so that the table number becomes smaller than No. 5).

In the case where the absolute value of XB exceeds 25000 in S6, the automatic adjusting section 13 judges in S9 if the XB is larger than 0 so as to determine how the density conversion table should be changed. A negative value of XB in S11 indicates that the character region is smaller than that of the preset region separation state, namely, a change in density in the reference document is too small. In this case, in S12, the automatic adjusting section 13 changes the density conversion table so that the change in density becomes larger (direction in which the table number becomes smaller than No. 5). In contrast, a positive value of XB indicates that the character region is larger than that of the preset region separation state, namely, a change in density in the reference document is too large. In this case, in S13, the automatic adjusting section 13 changes the density conversion table so that the change in density becomes smaller (direction in which the table number becomes greater than No. 5).

In the case where the absolute value of XC exceeds 25000 in S7, the automatic adjusting section 13 judges in S14 if the XC is larger than 0 so as to determine how the density conversion table should be changed. A negative value of XC in S14 indicates that the spot region is smaller than that of the preset region separation state, namely, a change in density in the reference document is too small. In this case, in S15, the automatic adjusting section 13 changes the density conversion table so that the change in density becomes larger (direction in which the table number becomes smaller than No. 5). In contrast, a positive value of XC indicates that the spot region is larger than that of the preset region separation state, namely, a change in density in the reference document is too large. In this case, in S16, the automatic adjusting section 13 changes the density conversion table so that the change in density becomes smaller (direction in which the table number becomes greater than No. 5).

Upon changing the density conversion table number in S9, S10, S12, S13, S15, or S16, the sequence returns to S1. The process is repeated until all regions fall within the target value. The automatic region separation adjusting process is finished when all regions fall within the target value.

As described, the image processing apparatus has an arrangement wherein, in Method 1, it is predicted how the density conversion table should be changed by referring to the region separation state before the automatic adjustment, and the density conversion table is changed based on the result of the prediction. This permits the density conversion table to be changed until values obtained from the predetermined calculation on the frequencies of the respective regions, which is obtained by region separation, fall in the range of the specified ratios, thereby realizing an automatic adjustment of region separation.

Note that, in S9, S10, S12, S13, S15, or S16, if threshold values are set at shorter intervals so as to determine the degree to which the change in density of the density conversion table increases or decreases according to the values of XA, XB, and XC, it is possible to make the processing speed faster. For example, in S9, when XA>−70001, the automatic adjusting section 13 shifts the density conversion table number so as to increase by 1, and when XA≦−70001, the automatic adjusting section 13 shifts the density conversion table number so as to increase by 2. Similarly, in S10, when XA<70001, the automatic adjusting section 13 shifts the density conversion table number so as to decrease by 1, and when XA≧70001, the automatic adjusting section 13 shifts the density conversion table number so as to decrease by 2. Also, in S12 and S15, when XB>−50001 and XC>−50001, respectively, the automatic adjusting section 13 shifts the density conversion table number so as to decrease by 1, and when XB≦−50001 and XC≦−50001, the automatic adjusting section 13 shifts the density conversion table number so as to decrease by 2. In S13 and S16, when XB<50001 and XC<50001, respectively, the automatic adjusting section 13 shifts the density conversion table number so as to increase by 1, and when XB≧50001 and XC≧50001, the automatic adjusting section 13 shifts the density conversion table number so as to increase by 2.

As described, when carrying out an automatic region separation adjustment, the amount by which the density conversion table should be changed can be predicted referring to the region separation state before automatic adjustment. A faster automatic region separation adjustment can be realized if the density conversion table is changed based on the result of the prediction.

Note that, by setting limits to the amount by which the density conversion table can be changed, it is possible to prevent overcorrection of the density conversion table or deterioration of an image associated with the change in the density conversion table.

Further, in the case where the density conversion table is changed so as to reach the limit or exceed the limit, it is likely that the input device or the image processing apparatus is malfunctioning. Thus, the image processing apparatus may be arranged such that in the case where the automatic region separation adjustment process does not finish even if the density conversion table is changed more than specified times (for example, 5 times or more), or in the case where the density conversion table of No. 1 or No. 9 is selected so as to reach the limit of the automatic region separation adjustment process, an alarm is given by the automatic adjusting section 13 or the image processing apparatus stops operating. This allows the image processing apparatus to automatically recognize the malfunction, thereby not troubling users.

As described, although the image processing apparatus may have an arrangement wherein two types or more of density conversion tables (see FIG. 9) are stored, and a table number is arbitrary chosen from the tables thus stored, the image processing apparatus may also be arranged so as to automatically prepare a density conversion table. Namely, a single reference density conversion table is prepared, and calculation is carried out with respect to the values of an input table so as to automatically prepare a density conversion table, thereby overcoming the problem of a limitation in a memory capacity or an accuracy.

Figures 11A, 11B, 11C, 11D, 11E, 11F, 11G, 11H, 11I:
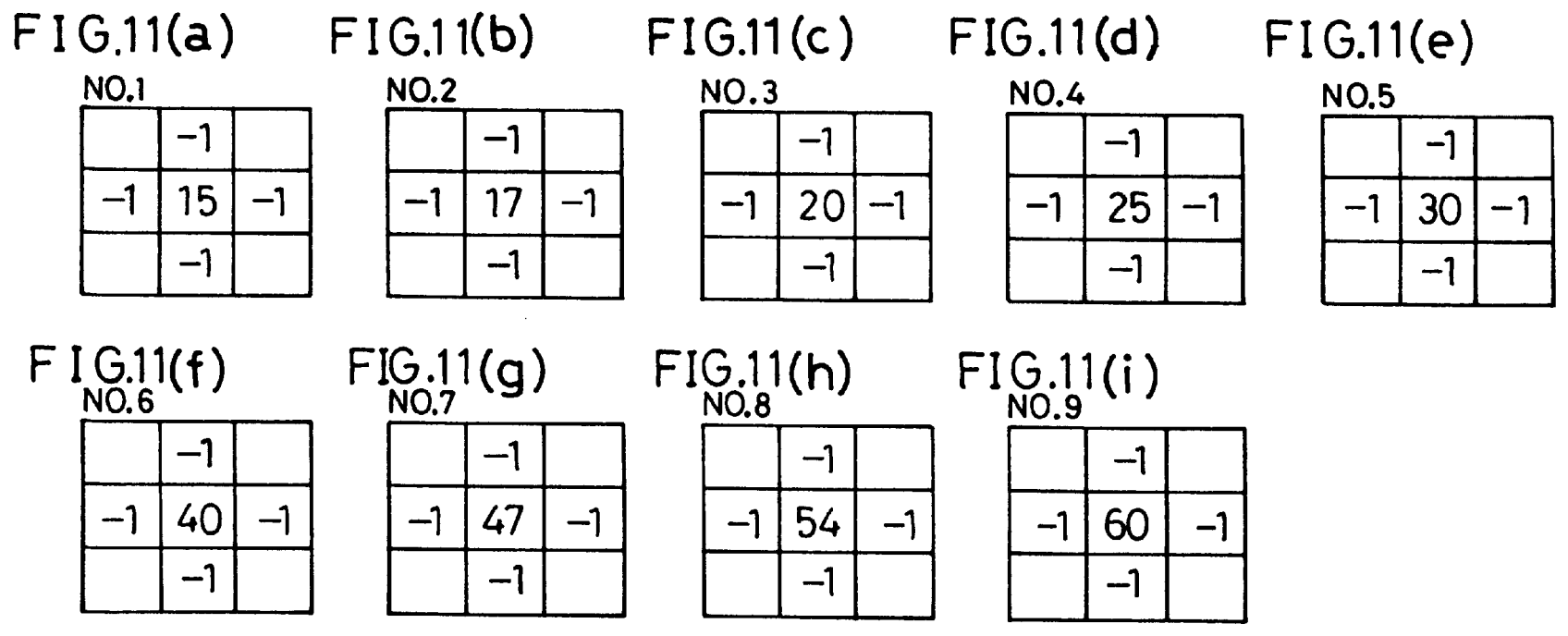

(Method 2) the sharpness of the input device is corrected by adjusting the filters. FIG. 11(*a*) through FIG. 11(*i*) are explanatory drawings showing the filters adopted by the method 2. The smaller the filter number is, the stronger the enhancement (edge strength) is, and the greater the filter number is, the weaker the enhancement is. A filter No. 5 is selected as an initial filter.

Figure 10:
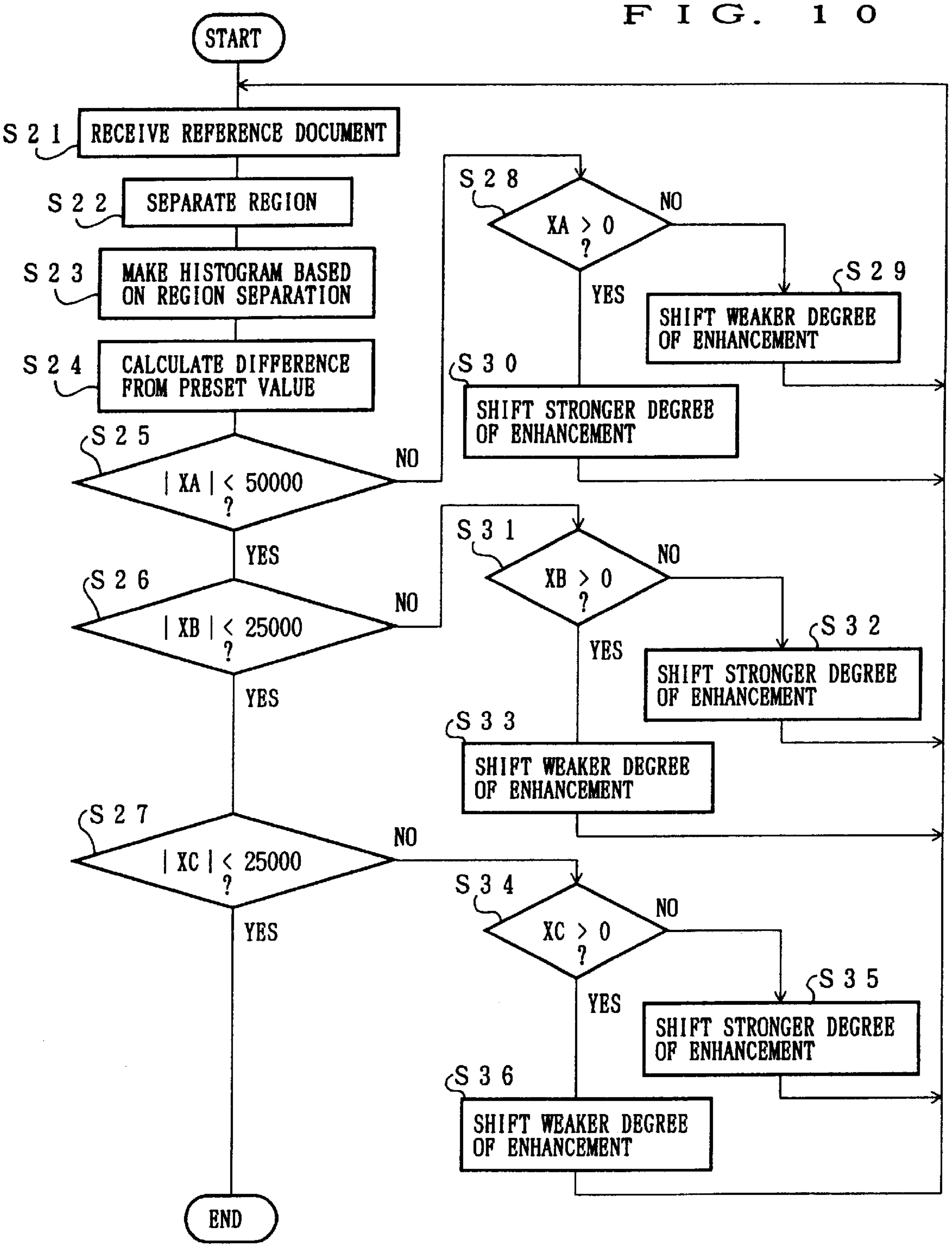
FIG. 10 is a flowchart showing the operation of an automatic adjusting process which is carried out by adjusting a filter in the image processing apparatus of FIG. 1.

FIG. 10 is a flowchart showing the operation of the method 2 of the present image processing apparatus. Note that, since S21 through S27 are same as S1 through S7 in FIG. 8, explanations thereof are omitted here.

In the case where the absolute value of XA exceeds 50000 in S25, the automatic adjusting section 13 judges in S28 if the XA is larger than 0 so as to determine how the filter should be changed. A negative value of XA in S8 indicates that the photographic region is smaller than that of the preset region separation state, namely, a change in density in the reference document is too large. In this case, in S29, the automatic adjusting section 13 changes the filter so that the degree of enhancement becomes weaker (so that the filter number becomes greater than No. 5). In contrast, a positive value of XA indicates that the photographic region is larger than that of the preset region separation state, namely, a change in density in the reference document is too small. In this case, in S30, the automatic adjusting section 13 changes the filter so that the degree of enhancement becomes larger (so that the filter number becomes smaller than No. 5).

In the case where the absolute value of XB exceeds 25000 in S26, the automatic adjusting section 13 judges in S31 if the XB is larger than 0 so as to determine how the filter should be changed. A negative value of XB in S31 indicates that the character region is smaller than that of the preset region separation state, namely, a change in density in the reference document is too small. In this case, in S32, the automatic adjusting section 13 changes the filter so that the degree of enhancement becomes stronger (so that the filter number becomes smaller than No. 5). In contrast, a positive value of XB indicates that the character region is larger than that of the preset region separation state, namely, a change in density in the reference document is too large. In this case, in S33, the automatic adjusting section 13 changes the density conversion table in a direction the change in density becomes smaller (direction in which the table number becomes larger than No. 5).

In S27 and S34 through S36, the same processes of S26 and S31 through S33 are carried out for XC.

Upon changing the density conversion table number in the step of S29, S30, S32, S33, S35, or S36, the sequence returns to S21. The processing is repeated until all the regions are within the target value. The automatic region separation adjusting process is finished when the all the regions are within the target value.

As described, the image processing apparatus has an arrangement wherein, in method 2, it is predicted how the filter should be changed by referring to the region separation state before the automatic adjustment, and the filter is changed based on the result of the prediction. This permits the filter to be changed until the values obtained from the predetermined calculation on the frequencies of the respective regions, which is obtained by region separation, fall in the range of the specified ratio, thereby realizing an automatic adjustment of region separation.

Note that, in S29, S30, S32, S33, S35, or S36, it is possible to have an arrangement wherein the threshold values are set at shorter intervals so as to determine the degree to which the change in enhancement of the filter increases or decreases. As described, when carrying out an automatic region separation adjustment, it is predicted how the filter should be changed by referring to the region separation state before the automatic adjustment. A faster automatic region separation adjustment can be realized if the filter is changed based on the result of the prediction.

Here, by setting limits to the amount by which the filter can be changed, it is possible to prevent overcorrection of the filter or deterioration of an image associated with the change in the filter.

Further, in the case where the filter is changed so as to reach the limit or exceed the limit, it is possible that the input device or the image processing apparatus is malfunctioning. Thus, the image processing apparatus is arranged such that in the case where the automatic region separation adjustment process does not finish even if the filter is changed more than specified times (for example, 5 times or more), or in the case where the filter of No. 1 or No. 9 is selected so as to reach the limit of the automatic region separation adjustment process, an alarm is given by the automatic adjusting section 13 or the image processing apparatus stops operating. This allows the image processing apparatus to automatically recognize the malfunction, thereby not troubling users.

As described, although the image processing apparatus may have an arrangement wherein two or more types of filters (see FIG. 11) are stored beforehand, and a reference filter is arbitrary chosen from the filters thus stored, the image processing apparatus may also be arranged so as to automatically prepare a filter. Namely, a single reference filter is prepared, and calculation is carried out with respect to the values of the filter so as to automatically prepare a filter, thereby overcoming the problem of a limitation in a memory capacity or an accuracy.

(Method 3) the sharpness of the input device is corrected by adjusting the region separation table. FIG. 13(*a*) through FIG. 13(*i*) are explanatory drawings showing the region separation tables. In such region separation tables, as the table number becomes smaller, the sharpness increases due to the fact that the character region becomes greater, and as the table number becomes larger, the sharpness decreases due to the fact that the character region becomes smaller. A region separation table No. 5 is selected as an initial region separation table.

The following will describe FIG. 13(*a*) through FIG. 13(*i*) in more detail. As described, the maximum value indicates the highest density value in a predetermined range, and the minimum value indicates the lowest density value. From this it follows that (maximum value)−(minimum value) indicates the maximum density difference. Also, as described the complexity refers to the result of calculation of the density difference between neighboring pixels. Thus, a large density difference indicates that the pixel is most likely to be located in the character region, rather than in a photographic region having continuous gradation, and a large complexity indicates that the pixel is most likely to be located in the spot region, rather than in the photographic region. In other words, characters have a small complexity despite the fact that characters have a large maximum density difference. Similarly, spots have a large complexity despite the fact that spots have a small maximum density difference.

Figure 12:
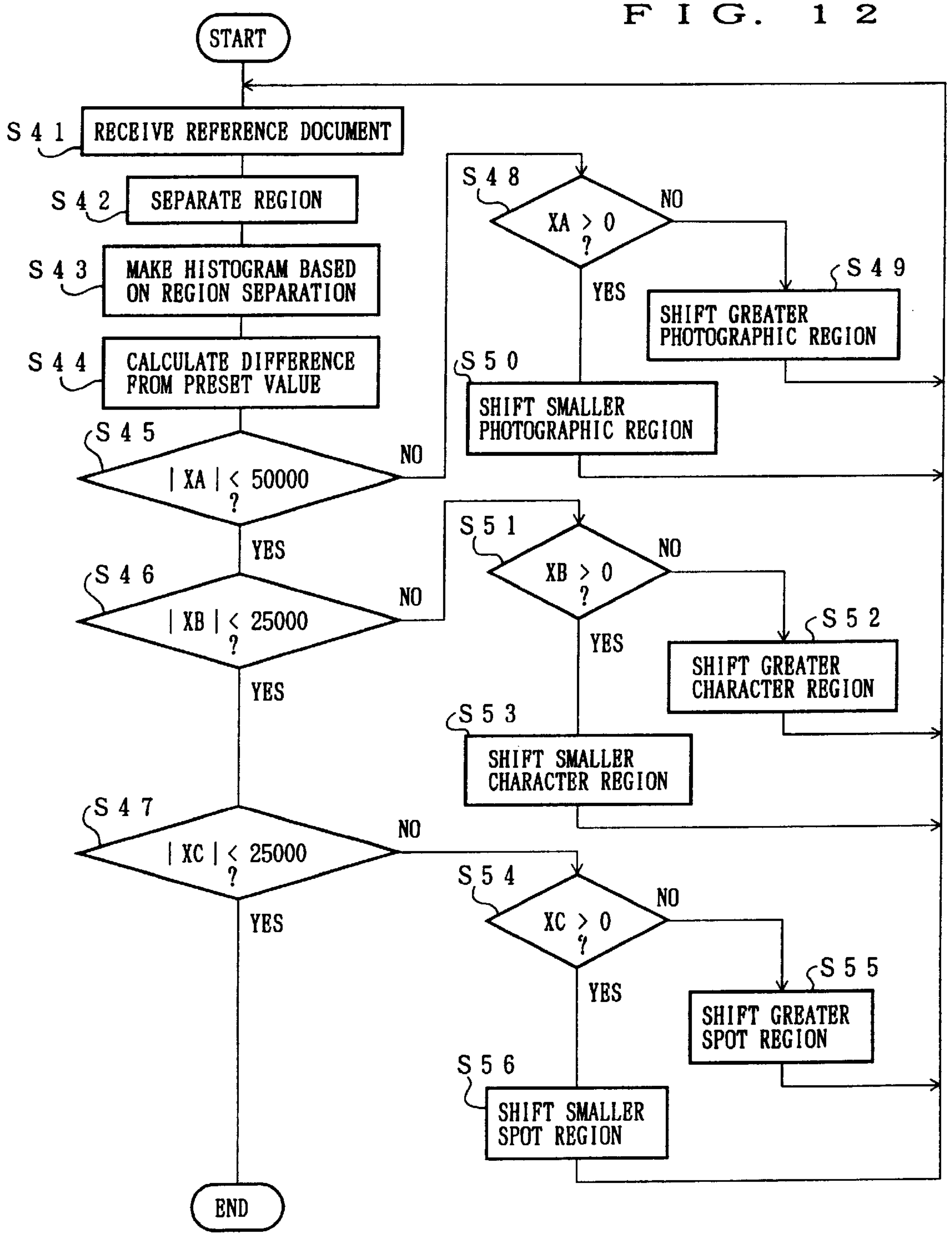
FIG. 12 is a flowchart showing the operation of an automatic adjusting process when a region separation table is used in the image processing apparatus of FIG. 1.
Figure 13A:
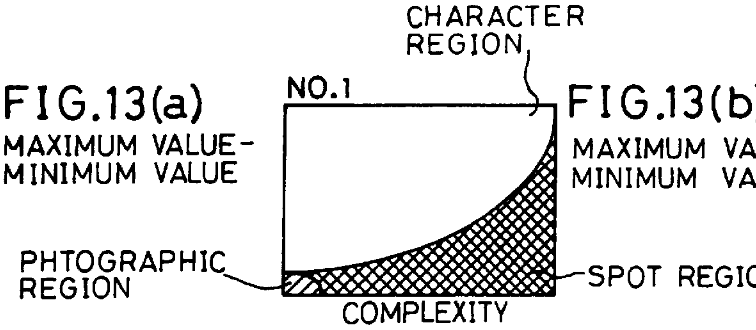
FIG. 13(*a*) through FIG. 13(*i*) are explanatory drawings showing the region separation table.
Figure 13B:
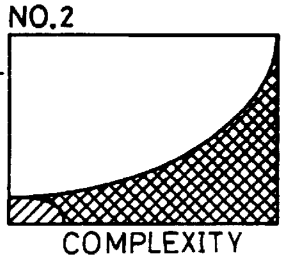
Figure 13C:
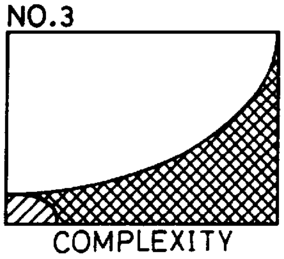
Figure 13D:
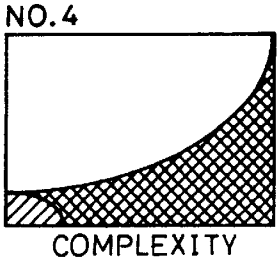
Figure 13E:
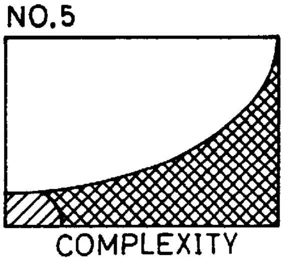
Figure 13F:
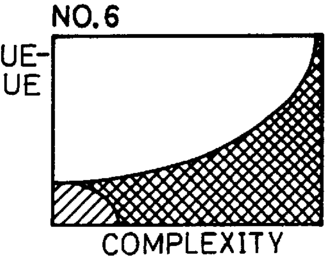
Figure 13G:
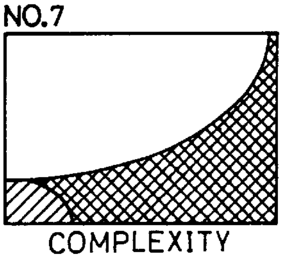
Figure 13H:
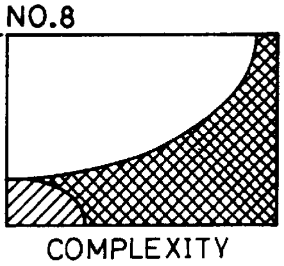
Figure 13I:
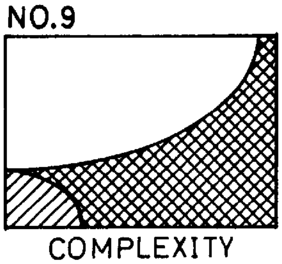

FIG. 12 is a flowchart showing the operation of the method 3 of the present image processing apparatus. Note that, since S41 through S47 are same as S1 through S7 in FIG. 8, explanations thereof are omitted here.

In the case where the absolute value of XA exceeds 50000 in S45, the automatic adjusting section 13 judges in S48 if the XA is larger than 0 so as to determine how the region separation table should be changed. A negative value of XA in S48 indicates that the photographic region is smaller than that of the preset region separation state, namely, a change in density in the reference document is too large. In this case, in S49, the automatic adjusting section 13 changes the region separation table so that the photographic region becomes greater (so that the table number becomes greater than No. 5). In contrast, a positive value of XA indicates that the photographic region is greater than that of the preset region separation state, namely, the photographic region in the reference document is too large. In this case, in S50, the automatic adjusting section 13 changes the region separation table so that the photographic region becomes smaller (so that the table number becomes smaller than No. 5).

In the case where the absolute value of XB exceeds 25000 in S46, the automatic adjusting section 13 judges in S51 if the XB is larger than 0 so as to determine how the region separation table should be changed. A negative value of XB in S51 indicates that the character region is smaller than the preset region separation state, namely, the character region in the reference document is too small. In this case, in S52, the automatic adjusting section 13 changes the region separation table so that the character region becomes greater (so that the table number becomes smaller than No. 5). In contrast, a positive value of XB indicates that the character region is larger than that of the preset region separation state, namely, the character region in the reference document is too large. In this case, in S53, the automatic adjusting section 13 changes the region separation table so that the character region becomes smaller (so that the table number becomes larger than No. 5).

In S47 and S54 through S56, the same processes of S46 and S51 through S53 are carried out for XC.

Upon changing the region separation table number in S49, S50, S52, S53, S55, or S56, the sequence returns to S41. The processing is repeated until all the regions fall within the target value. The automatic region separation adjusting process is finished when all the regions fall within the target value.

As described, the image processing apparatus has an arrangement wherein, in method 3, it is predicted how the region separation table should be changed by referring to the region separation state, and the region separation table is changed based on the result of the prediction. This permits the region separation table to be changed until values obtained from the predetermined calculation on the frequencies of the respective regions, which is obtained by region separation, fall in the range of the specified ratio, thereby realizing an automatic adjustment of region separation.

Note that, in S49, S50, S52, S53, S55, or S56, as in method 1, it is possible to have an arrangement wherein the threshold values are set at shorter intervals so as to determine the degree to which the change in region of the region separation table increases or decreases. As described, when carrying out an automatic region separation adjustment, the amount by which the region separation table should be changed is predicted referring to the region separation state before automatic adjustment. A faster automatic region separation adjustment can be realized if the region separation table is changed based on the result of the prediction.

Here, by setting limits to the amount by which the region separation table can be changed, it is possible to prevent overcorrection of the region separation table or deterioration of an image associated with the change in the region separation table.

Further, in the case where the region separation table is changed so as to reach the limit or exceed the limit, it is possible that the input device or the image processing apparatus is malfunctioning. Thus, the image processing apparatus is arranged such that in the case where the automatic region separation adjustment process does not finish even if the region separation table is changed more than specified times (for example, 5 times or more), or in the case where the density conversion table of No. 1 or No. 9 is selected so as to reach the limit of the automatic region separation adjustment process, an alarm is given by the automatic region separating section 13 or the image processing apparatus stops operating. This allows the image processing apparatus to automatically recognize the malfunction, thereby not troubling users.

Further, when carrying out the automatic region separation adjustment, it is possible to combine at least two types or more of the density conversion table, the filter, and the region separation table (see method 1 through method 3). This further improves the region separation accuracy, which in turn, improves the image quality. Further, the image quality can also be improved by optimizing the combination and the order of the image processing based on the region separation state before automatic adjustment.

Figure 14:
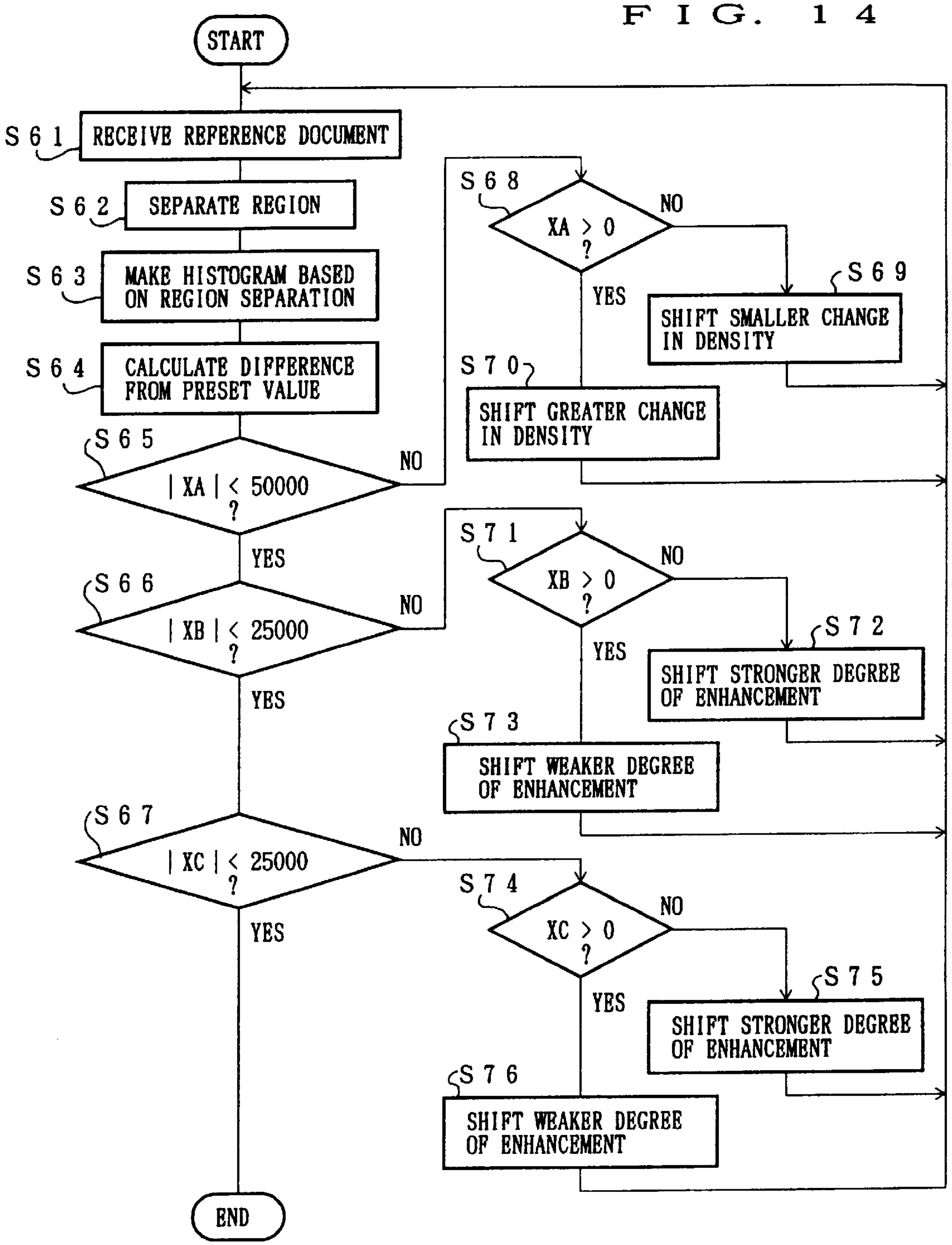
FIG. 14 is a flowchart showing the operation of an automatic adjusting process when a density conversion table and a region separation table are used in the image processing apparatus of FIG. 1.

FIG. 14 is a flowchart showing the operations of automatic region separation adjustment of the image processing apparatus which is carried out by the combination of (1) method 1 using the density conversion table and (2) method 2 using the filter. S61 through S70 of FIG. 14 are same as S1 through S10 of FIG. 8, and S71 through S76 of FIG. 14 are same as S31 through S36 of FIG. 10. Thus explanations thereof are omitted here.

In method 1 through method 3, since the target value of the automatic region separation adjustment is set beforehand, a fast automatic region separation adjustment can be carried out. Note that, in method 1 through method 3, the target value is set so as to fall in a range of ±10 per cent of a count ratio with respect to the preset value of the region separation state, yet a higher target value, for example, in a range of ±5 per cent of the count ratio, can be adopted so as to improve the accuracy.

Furthermore, as shown in Table 1, it may be arranged that the set value of the region separation state is set in stages (here, 5 stages) which can be changed arbitrarily.

TABLE 1

| | Character Mode | Photographic Mode |
|---|---|---|
| Stage① | AR = 600000 | AR = 600000 |
| | BR = 150000 | BR = 150000 |
| | CR = 150000 | CR = 150000 |
| Stage② | AR = 550000 | AR = 550000 |
| | BR = 225000 | BR = 225000 |
| | CR = 225000 | CR = 225000 |
| Stage③ | AR = 500000 | AR = 500000 |
| | BR = 250000 | BR = 250000 |
| | CR = 250000 | CR = 250000 |
| Stage④ | AR = 350000 | AR = 350000 |
| | BR = 350000 | BR = 350000 |
| | CR = 300000 | CR = 300000 |
| Stage⑤ | AR = 300000 | AR = 300000 |
| | BR = 400000 | BR = 400000 |
| | CR = 300000 | CR = 300000 |

With this arrangement, a target stage can be adjusted arbitrarily, thereby permitting to meet the user's preference. Further, because the target stage and the region separation state can be adjusted arbitrarily for each image mode, it is also possible to meet the user's preference. For example, if the stage ⑤ under the character mode is set, the character region becomes larger, thereby obtaining a sharp image with high contrast with respect to the entire image. Note that, the set values of the region separation state of Table 1 are examples of the case where an input system having a resolution of 400 dpi is adopted.

If the result of the automatic region separation adjustment is outputted and displayed in the form of Table 2, it is possible to grasp the current state of the present image processing apparatus.

TABLE 2

| | Character Mode | Photographic Mode |
|---|---|---|
| Region Separation State Set Value | Stage ③ | Stage ③ |
| Density Conversion Table Number | No. 5 | No. 5 |
| Filter Number | No. 5 | No. 5 |
| Region Separation Table Number | No. 5 | No. 5 |

For example, the density conversion table of No. 2 indicates extreme poor contrast, thereby informing of a dirty input system. Also, the greater filter numbers indicate the case of no contrast or a misregistration of the lens. Thus, by referring to the result of output, it is possible to know the time of maintenance and the malfunction with ease. Furthermore, it is also possible to prevent the malfunction in advance, thereby not troubling users, and permitting to maintain a high image quality.

Note that, according to the operation of the present image processing apparatus shown in FIG. 8, FIG. 10, FIG. 12, and FIG. 14, the automatic adjusting section 13 (1) makes a histogram from the result of region separation by the region separating section 12 so as to count the number of pixels in each region and (2) carries out automatic adjustment by comparing the number of pixels thus counted and the number of pixels in each region of the reference document. However, the operation of the image processing apparatus is not limited to the specified one. Alternatively, the automatic adjusting section 13 may (a) calculate the ratio of each region in accordance with the result of region separation for the received reference document by the region separating section 12 and (b) carry out automatic adjustment of region separation such that the ratio thus calculated is substantially equal to the specified ratio of the reference document.

As described, the image processing apparatus has an arrangement wherein the region separating section 12, upon receiving the reference document including the character region, the photographic region, and the spot region at a specified ratio, recognizes each region of the received reference document so as to separate the each region from one another, and the automatic adjusting section 13 adjusts each region thus separated such that each region corresponds to a predetermined region separation state.

With this arrangement, the automatic adjusting section 13 adjusts the region separation state of the character region, the photographic region, and the spot region which have been separated from one another by the region separating section 12. Here, if the preset region separation state is set so as to have the same specified ratio as that of the reference document, it is possible to improve the accuracy of region separation even if there exists variations in input devices, thereby permitting optimum image processing to be carried out on each region so as to improve the image quality of the final image. Further, it is also possible to make the final image to have a desired image quality if the preset region separation state is set as the user prefers.

Alternatively, the image processing apparatus may be arranged in such a manner that the automatic adjusting section 13 counts the number of pixels in each region separated by the region separating section 12 so as to adjust a region separation state.

With this arrangement, since the automatic adjusting section 13 adjusts the region separation state according to the number of pixels, the region separation state, which should be set beforehand, can be set in the form of the number of pixels, thereby making it easier to set a region separation state.

Further, the image processing apparatus may be arranged in such a manner that the automatic adjusting section 13 adjusts a separated state of each region based on a density conversion table in which a ratio of an outputted document density to an inputted document density is set.

With this arrangement, since the size of a separated region varies depending on the amount of change in density, a region separation state can be adjusted with ease when a density conversion table having a preset density change is used.

Also, the image processing apparatus is characterized in that the automatic adjusting section 13 adjusts a separated state of each region based on a filter in which a degree of enhancement is set.

With this arrangement, since the size of a separated region varies depending on the strength of the degree of enhancement, a region separation state can be adjusted with ease when a filter having a preset degree of enhancement is used.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image processing apparatus comprising:

an input section for creating image data of an inputted document;

a region separating section for recognizing whether each part of the inputted document belongs to a character region, a photographic region, or a spot region based on the image data created by the input section so as to carry out region separation for the inputted document; and an automatic adjusting section for adjusting region separation carried out by the region separating section based upon (1) a result of region separation carried out by the region separating section for a reference document for which a ratio of the character region, the photographic region, and the spot region is specified and (2) the ratio of the character region, the photographic region, and the spot region specified for the reference document, wherein said automatic adjusting section calculates the region separation of the character, photographic, and spot regions using the result of region separation, and adjusts region separation carried out by the region separating section based upon a ratio of the calculated region separation and a predetermined region separation for the reference document.

2. The image processing apparatus as set forth in claim 1, wherein said region separating section recognizes whether each pixel of the received reference document belongs to the character region, the photographic region, or the spot region so as to carry out the region separation for the reference document.

3. The image processing apparatus as set forth in claim 2, wherein said region separating section includes:

a maximum value detecting circuit for determining a maximum signal level of a block, the block being composed of a target pixel and its adjacent pixels of the received reference document;

a minimum value detecting section for determining a minimum signal level of the block;

a subtractor for outputting a difference of the maximum signal level and the minimum signal level as a first feature parameter;

a main-scanning direction difference sum calculating circuit for accumulating one after another the differences between every two adjoining pixels in a main-scanning direction in the block so as to determine a first sum of the differences;

a sub-scanning direction difference sum calculating circuit for accumulating one after another the difference between every two adjoining pixels in a sub-scanning direction in the block so as to determine a second sum of the differences;

a comparator for outputting a smaller one of the first and second sums as a second feature parameter; and a judging circuit for judging whether the target pixel belongs to the character region, the photographic region, or the spot region based on the first and second feature parameters respectively from the subtractor and the comparator.

4. The image processing apparatus as set forth in claim 3, further comprising:

a plurality of region separation tables, each being a two-dimensional plane having axes which correspond to the first parameter and the second parameter, border lines being provided on the two-dimensional plane, the border lines being provided so that the first and second parameters correspond to the character region, the photographic region, and the spot region, said each region separation table having specified border lines, wherein said judging circuit outputs a value indicating the respective likelihood that the target pixel belong to the character region, the photographic region, or the spot region based on the first and second parameters and one of the region separation tables so as to judge whether the target pixel belong to the character region, the photographic region, or the spot region.

5. The image processing apparatus as set forth in claim 4, wherein said automatic adjusting section changes the region separation table of the judging circuit so as to adjust region separation carried out by the region separating section.

6. The image processing apparatus as set forth in claim 3, wherein said judging circuit includes a neural network which, upon receiving the first and second parameters, outputs values indicating respective likelihood that the target pixel belong to the character region, the photographic region, and the spot region.

7. The image processing apparatus as set forth in claim 3, wherein said judging circuit judges whether the target pixel belong to the character region, the photographic region, or the spot region so as to determine, based on a result of the judgement, whether image processing should be carried out on the target pixel.

8. The image processing apparatus as set forth in claim 7, wherein said region separating section includes:

a filtering process circuit for carrying out a smoothing process and/or an enhancement process based on the result of judgement by said judging circuit, wherein the smoothing process reduces a change in a signal level by taking a weighted mean between the target pixel and the adjacent pixels, and the enhancement process increases even further a signal level changing in a large amount by adding to the target pixel a difference between the target pixel and the adjacent pixels.

9. The image processing apparatus as set forth in claim 2, wherein the number of pixels in the character region, the photographic region, and the spot region of the reference document are specified beforehand, and said automatic adjusting section compares the respective numbers of pixels counted in the character region, the photographic region, and the spot region separated by the region separating section and the respective specified numbers of pixels in the character region, the photographic region, and the spot region of the reference document so as to adjust region separation carried out by the region separating section.

10. The image processing apparatus as set forth in claim 1, further comprising:

a plurality of density conversion tables for determining a ratio of density of an inputted image and density of an outputted image, said density conversion tables having respective different ratios; and a density converting section for converting the density of the inputted image in accordance with one of the density conversion tables, wherein said automatic adjusting section changes the density conversion table of the density converting section so as to adjust region separation carried out by the region separating section.

11. The image processing apparatus as set forth in claim 1, further comprising:

a plurality of filters for determining respective degrees to which an inputted image should be enhanced, said plurality of filters having a different degree of enhancement; and a filter section for carrying out a filtering process on an inputted image with one of said filters, wherein said automatic adjusting section changes the filter of the filter section so as to adjust region separation carried out by the region separating section.

12. The image processing apparatus as set forth in claim 1, wherein said automatic adjusting section outputs an alarm in the case where (1) the adjustment of the region separation carried out by the region separating section by the automatic adjustment section does not end even after predetermined numbers of adjustments or (2) the adjustment of the region separation carried out by the region separating section reaches a limit.

13. The image processing apparatus as set forth in claim 1, wherein the ratio of the character region, the photographic region, and the spot region is variable.

14. An image processing apparatus comprising:

an input section for creating image data of an inputted document;

a region separating section for recognizing whether each part of the inputted document belongs to a character region, a photographic region, or a spot region based on the image data created by the input section so as to carry out region separation for the inputted document; and an automatic adjusting section, wherein:

upon receiving a reference document including a character region, a photographic region and a spot region, said region separating section recognizes and separates each region of the received reference document; and said automatic adjusting section calculates a region separation state of the character, photographic, and spot regions using a result of region separation, and adjusts region separation carried out by the region separating section based upon a ratio of the calculated region separation state and a predetermined region separation state for the reference document.

15. The image processing apparatus as set forth in claim 14, wherein said automatic adjusting section counts the number of pixels in each region separated by the region separating section so as to adjust the region separation state.

16. The image processing apparatus as set forth in claim 14, wherein said automatic adjusting section adjusts a separated state of each region based on a density conversion table in which a ratio of an inputted document density to an outputted document density is set.

17. The image processing apparatus as set forth in claim 14, wherein said automatic adjusting section adjusts a separated state of each region based on a filter in which a degree of enhancement is set.

18. The image processing apparatus as set forth in claim 1, wherein said input section creates image data by optically scanning a document and transmits this image data to said region separating section.

19. The image processing apparatus as set forth in claim 14, wherein said input section creates image data by optically scanning a document and transmits this image data to said region separating section.

20. An image processing apparatus comprising:

an input section for creating image data of an inputted document;

a region separating section for recognizing whether each part of the inputted document belongs to a character region, a photographic region, or a spot region based on the image data created by the input section so as to carry out a region separation for the inputted document using one of a plurality of region separation tables; and an automatic adjusting section for adjusting the region separation being carried out by the region separating section, the region separation being adjusted by replacing the region separation table being used by the region separating section with another one of the region separation tables based upon (1) a result of region separation carried out by the region separating section for a reference document and (2) a ratio of a region separation state of the character region, the photographic region and the spot region calculated using the result of region separation, and a region separation state specified for the reference document.

* * * * *